(12) United States Patent
Jones et al.

(10) Patent No.: US 12,454,200 B2
(45) Date of Patent: Oct. 28, 2025

(54) BACK ELECTROMOTIVE FORCE MANAGEMENT FOR ELECTRIC VEHICLES

(71) Applicant: GM GLOBAL TECHNOLOGY OPERATIONS LLC, Detroit, MI (US)

(72) Inventors: Christopher Lyman Jones, Atlanta, GA (US); Todd M. York, Highland, MI (US); Anthony H. Heap, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 18/494,764

(22) Filed: Oct. 25, 2023

(65) Prior Publication Data

US 2025/0135959 A1    May 1, 2025

(51) Int. Cl.
*B60L 58/40*    (2019.01)
*B60L 3/00*    (2019.01)
*B60L 50/75*    (2019.01)

(52) U.S. Cl.
CPC ............ *B60L 58/40* (2019.02); *B60L 3/0061* (2013.01); *B60L 50/75* (2019.02); *B60L 2240/427* (2013.01)

(58) Field of Classification Search
CPC ........ B60L 58/40; B60L 50/75; B60L 3/0061; B60L 2240/427
See application file for complete search history.

(56) References Cited

U.S. PATENT DOCUMENTS

| | | | | |
|---|---|---|---|---|
| 4,055,789 A | * | 10/1977 | Lasater | H02J 7/14 320/155 |
| 4,444,285 A | * | 4/1984 | Stewart | B60W 10/08 180/65.245 |
| 5,427,196 A | * | 6/1995 | Yamaguchi | B60W 20/40 903/910 |

FOREIGN PATENT DOCUMENTS

| | | |
|---|---|---|
| DE | 19835576 A1 | 8/1999 |
| DE | 102013216311 A1 | 2/2015 |
| DE | 102015224922 A1 | 6/2017 |
| DE | 102021132202 A1 | 9/2022 |

* cited by examiner

*Primary Examiner* — Gertrude Arthur Jeanglaude
(74) *Attorney, Agent, or Firm* — Ingrassia Fisher & Lorenz, LLP | IF&L

(57) ABSTRACT

An electric vehicle battery control system including a first electric motor configured to propel a vehicle in a drive mode in response to a drive current, a second electric motor operative to generate a back electromotive force voltage in a fault mode, a battery, having an open circuit battery discharge voltage, for generating the drive current for coupling to the first electric motor, and a vehicle controller for limiting the drive current in response to a difference between the back electromotive force voltage and the open circuit battery discharge voltage being less than a threshold voltage difference.

20 Claims, 6 Drawing Sheets

300

400

BACK ELECTROMOTIVE FORCE MANAGEMENT FOR ELECTRIC VEHICLES

INTRODUCTION

The present disclosure generally relates to controlling vehicle systems in response to a prediction of excessive back electromotive force from an electric motor, and more particularly relates to a method and apparatus for voltage management through torque determination to prevent damage resulting from back electromotive force from failed permanent magnet motors on multi-motor vehicles.

Electric motors are used in electric vehicles (EV) to convert electrical energy from the battery into mechanical energy to turn the wheels. Typically there are two main types of electric motors used in EVs: induction motors and permanent magnet synchronous motors (PMSMs). Induction motors are the most common type of electric motor used in EVs. They are relatively simple and inexpensive to manufacture. Induction motors are also very efficient, and they can provide a high torque output. PMSMs are more expensive than induction motors, but they are also more efficient and offer better performance. PMSMs are often used in high-performance EVs, such as sports cars and racing cars. Modern EVs typically have two electric motors, one for each axle, but some EVs can have a single motor located under the hood or four motors, one for each wheel.

While the need to protect vehicle operation during damaging or destructive operating conditions is clear, it is desirable that any vehicle protect algorithms be used optimally to provide the maximum protection to the vehicle while continuing to provide service to a driver. It is desirable to overcome the aforementioned problems in order to provide systems and methods for vehicle system protection and continued vehicle operation for vehicle propulsion and driver assistance systems. Furthermore, other desirable features and characteristics of the present invention will become apparent from the subsequent detailed description and the appended claims, taken in conjunction with the accompanying drawings and the foregoing technical field and background.

SUMMARY

Disclosed herein are vehicle control methods and systems and related electrical systems for provisioning motor systems, methods for making and methods for operating such systems, and motor vehicles and other equipment such as aircraft, ships, wind turbines and other EVs equipped with onboard propulsion systems. By way of example, and not limitation, there are presented various embodiments of systems for the mitigation of vehicle hardware damage due to back EMP generated from an electric drive motor in regenerative mode.

In a first non-limiting embodiment, a propulsion system including a first electric motor configured to propel a vehicle in a drive mode in response to a drive current, a second electric motor operative to generate a back electromotive force voltage in a fault mode, a battery, having an open circuit battery discharge voltage, for generating the drive current for coupling to the first electric motor, and a vehicle controller for limiting the drive current in response to a difference between the back electromotive force voltage and the open circuit battery discharge voltage being less than a threshold voltage difference.

In accordance with another aspect of the present disclosure, wherein the battery forms part of a rechargeable energy storage system.

In accordance with another aspect of the present disclosure, a vehicle speed sensor for determining a vehicle speed and wherein the threshold voltage difference is determined in response to the vehicle speed and a predicted motor torque and a predicted motor power of the second electric motor at the vehicle speed and a predicted back electromotive force voltage of the second electric motor in the fault mode.

In accordance with another aspect of the present disclosure, a battery charge level sensor for determining a battery charge level and wherein the threshold voltage difference is determined in response to the battery charge level and the motor output voltage.

In accordance with another aspect of the present disclosure, a processor for calculating a predicted motor torque and a predicted motor power of the first electric motor and wherein the drive current is further limited in response to a discharge voltage limit of the back electromotive force voltage.

In accordance with another aspect of the present disclosure, wherein the vehicle controller is further configured to apply a mechanical brake to the first electric motor in response to the difference between the back electromotive force voltage and the open circuit battery discharge voltage being less than a threshold voltage difference.

In accordance with another aspect of the present disclosure, wherein the vehicle controller is further configured to reduce a vehicle speed in response to the difference between the back electromotive force voltage and the open circuit battery discharge voltage being less than a threshold voltage difference.

In accordance with another aspect of the present disclosure, wherein the vehicle controller is further configured to short at least three phases of the second electric motor in response to the difference between the back electromotive force voltage and the open circuit battery discharge voltage being less than a threshold voltage difference.

In accordance with another aspect of the present disclosure, including a fuel cell and wherein the vehicle controller is further configured to activate the fuel cell in response to difference between the back electromotive force voltage and the open circuit battery discharge voltage being less than a threshold voltage difference, wherein the fuel cell is configured to generate an auxiliary voltage to elevate the open circuit battery discharge voltage to increase the difference between the back electromotive force voltage and the open circuit battery discharge.

In accordance with another aspect of the present disclosure, wherein the vehicle controller is further configured to detect a defective state of the second electric motor and for limiting a vehicle speed in response to a detection of the defective state of the second electric motor.

In accordance with another aspect of the present disclosure, a method of controlling a rechargeable energy storage propulsion system including calculating a back electromotive force voltage from an electric motor, determining a vehicle speed, determining a battery output voltage, and limiting at least one of a torque and a power to a drive unit, and the vehicle speed in response to a difference between the back electromotive force voltage and the battery output voltage being less than a threshold difference.

In accordance with another aspect of the present disclosure, determining the at least one of the torque and the power to the drive unit in response to the difference between the back electromotive force voltage and the battery output voltage being less than a threshold difference.

In accordance with another aspect of the present disclosure, wherein the back electromotive force voltage is limited by reducing a speed of a host vehicle.

In accordance with another aspect of the present disclosure, wherein the back electromotive force voltage is limited by actuating a short of at least three coils of the electric motor.

In accordance with another aspect of the present disclosure, wherein the threshold difference is determined in response to a difference between a predicted back electromotive force voltage determined in response to the vehicle speed and the battery output voltage.

In accordance with another aspect of the present disclosure, wherein the back electromotive force voltage is estimated in response to the vehicle speed and a least one of a stator temperature and a rotor temperature of the electric motor.

In accordance with another aspect of the present disclosure, wherein the back electromotive force voltage is calculated in response to the electric motor being in a fault state and a drive motor being in a drive state.

In accordance with another aspect of the present disclosure, further including an alternate power source and a controls to artificially elevate the open circuit battery discharge voltage via the alternate power source to provide an additional voltage drop headroom between the open circuit battery discharge voltage and the back electromotive force voltage in order to provide an additional torque and power for a tractive effort in a drive motor in a drive state.

In accordance with another aspect of the present disclosure, a rechargeable energy storage system control system including a first electric motor configured to configured to propel a vehicle in response to a first drive current, a second electric motor configured to propel the vehicle in response to a second drive current and operative to generate a back electromotive force voltage in during a fault state, a battery for storing an electric charge for generating the first drive current and the second drive current, wherein the battery has an open circuit battery discharge voltage, and a controller, including a processor, configured for limiting the first drive current in response to a difference between the open circuit battery discharge voltage and the back electromotive force voltage being less than a threshold difference.

In accordance with another aspect of the present disclosure, wherein the controller is further configured to limit a vehicle speed in response the second electric motor being in a fault state and at least one of a determined minimum torque and a determined minimum power to be available to the first electric motor unit in response to the difference between the back electromotive force voltage and the battery output voltage being less than a threshold.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application-specific integrated circuit (ASIC), a field-programmable gate array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
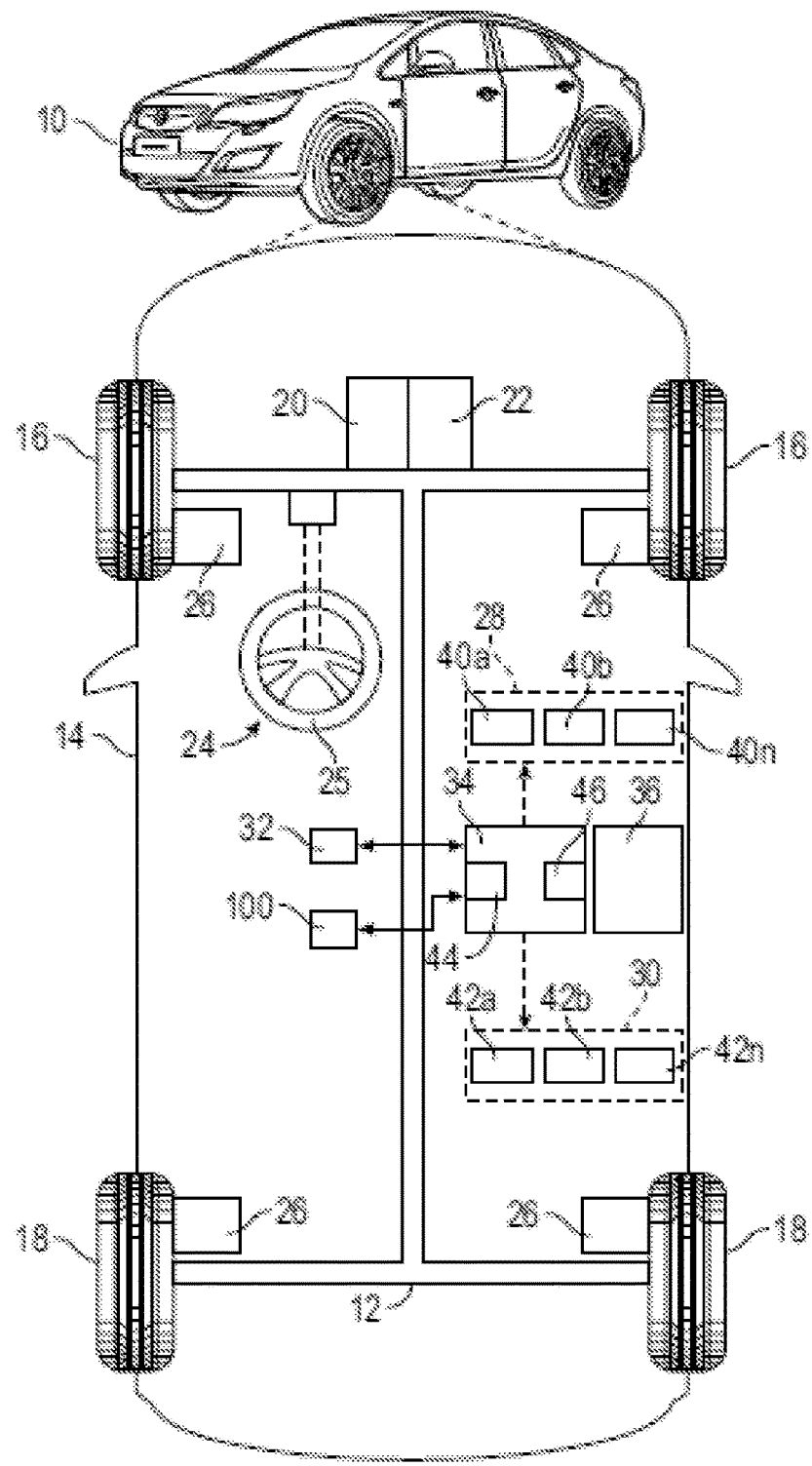
FIG. 1 shows a control system associated with a vehicle in accordance with various embodiments.

With reference to FIG. 1, a control system 100 is associated with a vehicle 10 (also referred to herein as a "host vehicle") in accordance with various embodiments. In general, the control system (or simply "system") 100 provides for control of various actions of the vehicle 10 (e.g., torque control) established by Reinforcement Learning (RL) which is or can be stored in a DNN type model that controls operation in response to data from vehicle inputs, for example, as described in greater detail further below in connection with FIGS. 2-4.

In various exemplary embodiments, system 100 provides a process using an algorithm that controls torque and speed in a host vehicle's 10 embedded controller software of the system 100 allowing DNNs to be used for an ACC behavior prediction model. The system 100 enables learning of driver's preference for following distance for different vehicles such a target vehicle and to classify driver's preference based on driving scenarios; e.g., traffic signs, stop and go traffic, city driving, and the like. The system 100 uses a Q-matrix to build a knowledge base for target vehicles following a performance preference by utilizing online and historical driver and environmental information.

As depicted in FIG. 1, vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, vehicle 10 is autonomous or semi-autonomous, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

As shown, the vehicle 10 generally includes a propulsion system 20, a transmission system 22, a steering system 24, a brake system 26, a canister purge system 31, one or more user input devices 27, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmissions.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences the position of the vehicle wheels 16 and/or 18. While depicted as including a steering wheel for illustrative purposes, in some embodiments contemplated within the scope of the present disclosure, the steering system 24 may not include a steering wheel.

The controller 34 includes at least one processor 44 (and neural network) and a computer-readable storage device or media 46. As noted above, in various embodiments, the controller 34 (e.g., the processor 44 thereof) provides data pertaining to a projected future path of the vehicle 10, including projected future steering instructions, to the steering control system 84 in advance, for use in controlling steering for a limited period of time in the event that communications with the steering control system 84 become unavailable. Also, in various embodiments, the controller 34 provides communications to the steering control system 84 via the communication system 36 described further below, for example, via a communication bus and/or transmitter (not depicted in FIG. 1).

In various embodiments, controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store multiple neural networks, along with various operating variables, while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As depicted in FIG. 1, the vehicle 10 generally includes, in addition to the above-referenced steering system 24 and controller 34, a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the wheels 16, 18 include a wheel assembly that also includes respectively associated tires.

In various embodiments, the vehicle 10 is an autonomous vehicle, and the control system 100, and/or components thereof, are incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

The controller 34 includes a vehicle controller that operates based on the neural networks 33 model's output. In an exemplary embodiment, a feed-forward operation can be applied for an adjustment factor that is the continuous output of the neural network 33 models to generate a control action for the desired torque or other like action (in case of a continuous neural network 33 models, for example, the continuous APC/SPARK prediction values are outputs).

In various embodiments, one or more user input devices receive inputs from one or more passengers (and driver 11) of the vehicle 10. In various embodiments, the inputs include a desired destination of travel for the vehicle 10. In certain embodiments, one or more input devices 27 include an interactive touch-screen in the vehicle 10. In certain embodiments, one or more input devices 27 include a speaker for receiving audio information from the passengers. In certain other embodiments, one or more input devices 27 may include one or more other types of devices and/or may be coupled to a user device (e.g., smartphone and/or other electronic devices) of the passengers.

The sensor system 28 includes one or more sensors 40a-40n that sense observable conditions of the exterior environment and/or the interior environment of the vehicle 10. The sensors 40a-40n include but are not limited to, radars, lidars, global positioning systems, optical cameras, thermal cameras, ultrasonic sensors, inertial measurement units, and/or other sensors.

The actuator system 30 includes one or more actuators 42a-42n that control one or more vehicle features such as, but not limited to, canister purge system 31, the intake system 38, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 10, including the storing of data of a DNN that is established by the RL, used to predict a driver behavior for the vehicle control. In various embodiments, the data storage device 32 stores a machine learning model of a DNN and other data models established by the RL. The model established by the RL can take place for a DNN behavior prediction model or RL established model (See. FIG. 2, DNN prediction model or RL prediction model). In an exemplary embodiment, no separate training is required for the DNN rather, the DNN behavior prediction model (i.e., DNN prediction model) is implemented with a set of learned functions. In various embodiments, the neural network (i.e., DNN behavior prediction model) may be established by RL or trained by a supervised learning methodology by a remote system and communicated or provisioned in vehicle 10 (wirelessly and/or in a wired manner) and stored in the data storage device 32. The DNN behavior prediction model can also be trained via supervised or unsupervised learning based on input vehicle data of a host vehicle operations and/or sensed data about a host vehicles operating environment.

The data storage device 32 is not limited to control data, as other data may also be stored in the data storage device 32. For example, route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of controller 34, separate from controller 34, or part of controller 34 and part of a separate system.

Controller 34 implements the logic model established by RL or for the DNN based on the DNN behavior model that has been trained with a set of values, includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chipset), any combination thereof, or generally any device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the communication system 36 is used for communications between the controller 34, including data pertaining to a projected future path of the vehicle 10, including projected future steering instructions. Also, in various embodiments, the communication system 36 may facilitate communications between the steering control system 84 and/or more other systems and/or devices.

In certain embodiments, the communication system 36 is further configured for communication between the sensor system 28, the input device 27, the actuator system 30, one or more controllers (e.g., the controller 34), and/or more other systems and/or devices. For example, the communication system 36 may include any combination of a controller area network (CAN) bus and/or direct wiring between the sensor system 28, the actuator system 30, one or more controllers 34, and/or one or more other systems and/or devices. In various embodiments, the communication system 36 may include one or more transceivers for communicating with one or more devices and/or systems of the vehicle 10, devices of the passengers, and/or one or more sources of remote information (e.g., GPS data, traffic information, weather information, and so on).

Figure 2A:
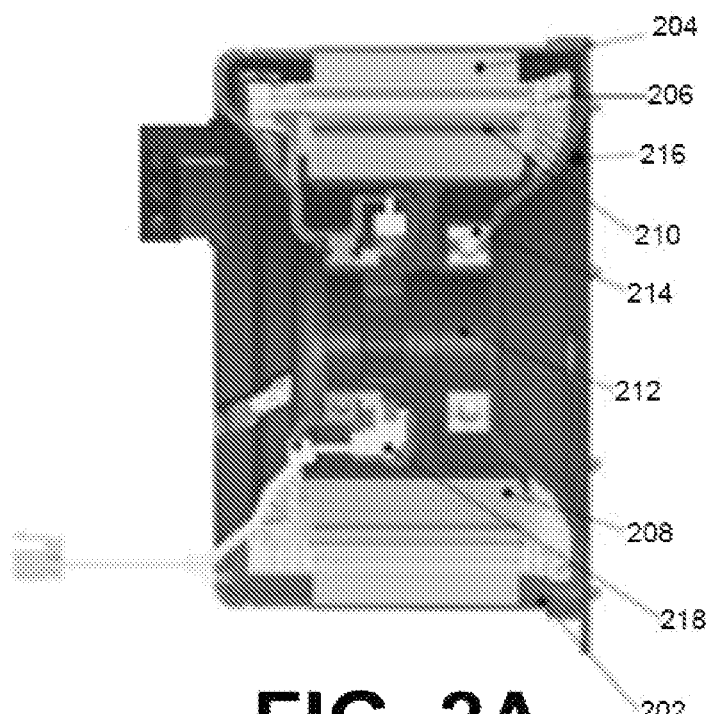
FIGS. 2A and 2B are diagrams depicting cross-sectional views of an exemplary electric machine from two different perspectives in accordance with various embodiments.
Figure 2B:
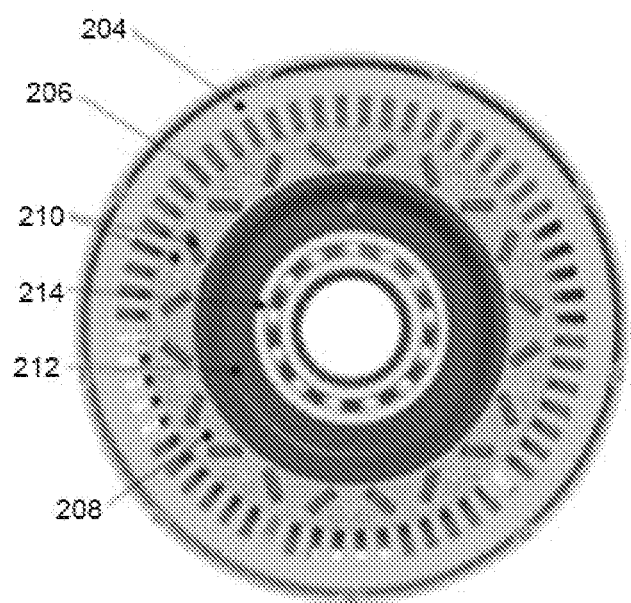

FIGS. 2A and 2B are diagrams depicting cross-sectional views of an exemplary electric machine 200 from two different perspectives. The exemplary electric machine 200 includes a housing 202 surrounding the example electric machine 200 and a stator stack 204 within the housing 202. The example stator stack 204 includes a plurality of windings 206 around an inner periphery of the stator stack 204. Enclosed within the exemplary stator stack 204 is a rotor stack 208. The example rotor stack 208 includes a plurality of magnets 210 and a rotor hub 212. The example rotor stack 208 is configured to rotate within the stator stack 204 using a set of bearings 214. The example stator stack 204 and example rotor stack 208 are enclosed within the housing 202 by an end cover 216. The example electric machine 200 further includes a resolver 218 for measuring the degrees of rotation of the rotor stack 208.

Figure 3:
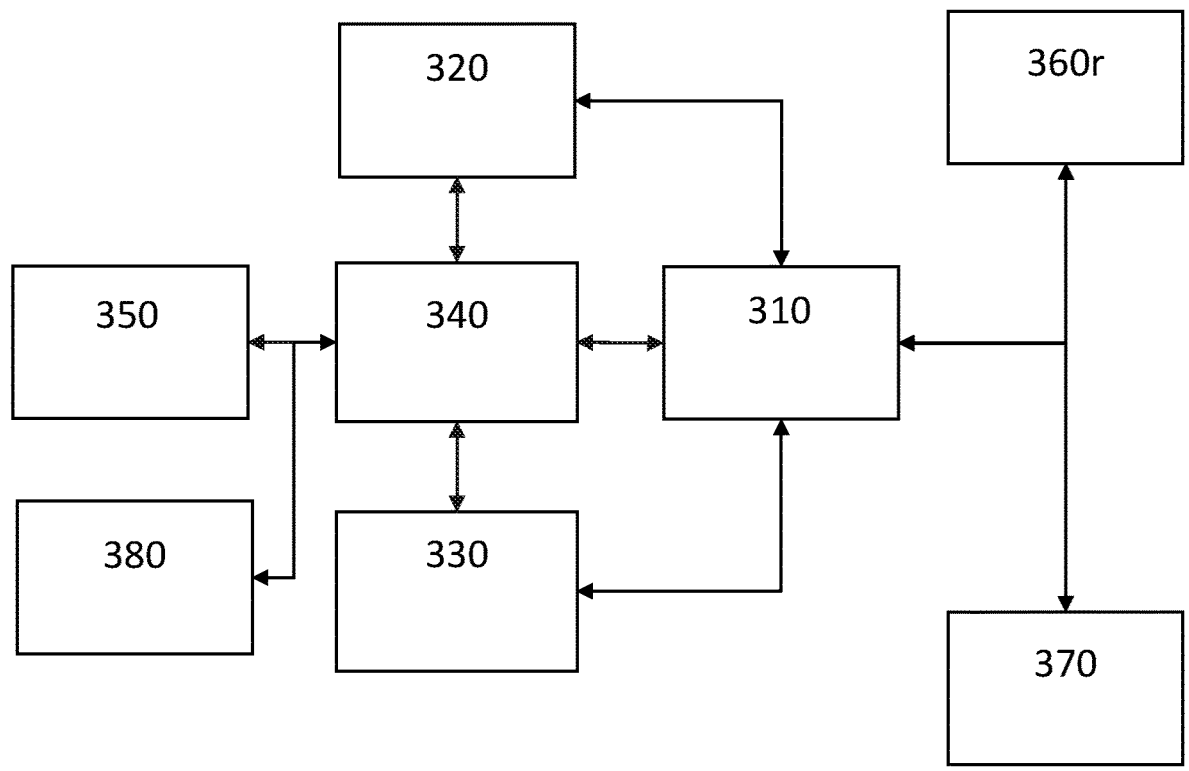
FIG. 3 shows an exemplary EV propulsion system for use with back electromotive force management for electric vehicles in accordance with various embodiments.

Turning now to FIG. 3, an exemplary EV propulsion system 300 for use with back electromotive force management for electric vehicles in accordance with various embodiments is shown. The exemplary EV propulsion system 300 can include a motor controller 310, a power converter 340, a first drive motor 320, a second drive motor 330, a battery 350, a vehicle controller 370 and a sensor 360.

The vehicle controller 370 is configured for translating the vehicle's desired trajectory, or motion path, into control commands for the vehicle's actuators, such as the steering wheel, throttle, and brakes. The vehicle controller 370 takes into account the vehicle's current state and the environment to determine the best way to achieve the desired trajectory. The vehicle controller 370 can include longitudinal control and lateral control. Longitudinal control is responsible for controlling the vehicle's speed and acceleration, while lateral control is responsible for controlling the vehicle's steering angle and direction of travel. The vehicle controller 370 can use a variety of sensors 360 to gather information about the vehicle's state and the environment. These sensors include cameras, radar, lidar, and ultrasonic sensors. The vehicle controller 370 can use this sensor information to create a model of the vehicle's surroundings and to predict the vehicle's future behavior. Once the vehicle controller 370 has a model of the vehicle and its surroundings, it can use this model to determine the best way to achieve the desired motion path. The vehicle controller 370 will take into account factors such as the vehicle's speed, the road conditions, the presence of other vehicles and pedestrians, and the traffic laws. The vehicle controller 370 then sends control commands to the motor controller 310 and other lateral and longitudinal controllers to control the vehicle along the desired motion path.

The battery 350 stores the electrical energy that powers the first drive motor 320, the second drive motor 330 and other EV systems. The battery 350 is rechargeable and is typically made up of hundreds or even thousands of individual battery cells. EV batteries differ from starting, lighting, and ignition (SLI) batteries, as they are typically lithium-ion batteries that are designed for high power-to-weight ratio and energy density. Smaller, lighter batteries are desirable because they reduce the weight of the vehicle and therefore improve its performance. The individual battery cells are connected in series and parallel to achieve the desired voltage and capacity. The cells are typically arranged in modules, which are then packaged together in a battery pack that is mounted in the vehicle.

The most common type of EV battery is the lithium-ion (Li-ion) battery. Li-ion batteries have a high energy density, meaning that they can store a lot of energy in a relatively small and lightweight package. They also have a low self-discharge rate, meaning that they can hold their charge for a long time without being used. Other types of batteries that are sometimes used in EVs include nickel-metal hydride (NiMH) batteries, lead-acid batteries, solid-state batteries, lithium-sulfur batteries and aluminum-ion batteries. NiMH batteries have a lower energy density than Li-ion batteries, but they are less expensive. Lead-acid batteries have the lowest energy density of all three types of batteries, but they are also the least expensive. Solid-state batteries use a solid electrolyte instead of a liquid electrolyte. This makes them safer and more energy-dense than traditional lithium-ion batteries. Lithium-sulfur batteries have a higher energy density than lithium-ion batteries, but they are still under development. Aluminum-ion batteries are less expensive than lithium-ion batteries, but they have a lower energy density.

The battery 350 first provides electrical energy to the power converter 340. The power converter 340 is configured to convert the direct current (DC) electricity from the battery 350 to alternating current (AC) electricity to power the first drive motor 320 and the second drive motor 330. The power converter 340 employs a plurality of electronic switches, such as MOSFETS, to turn the current on and off at different frequencies and durations to convert the DC electrical energy to the AC electrical energy. The power converter 340 can further include a battery management system (BMS) to monitor and manage the battery 350 to ensure safe and efficient operation by tracking the state of charge, temperature, and other parameters of the battery 350.

In some exemplary embodiments, the motor controller 310 can be configured to control the flow of electricity from the power converter 340 to the first drive motor 320 and the second drive motor 330. This allows the motor controller 310 to control the speed and torque of the drive motor 320,330. In some exemplary embodiments the motor controller 310 can use field-oriented control (FOC) to precisely control the motor's torque and speed. FOC is a control algorithm that uses feedback from the motor's position and current sensors to calculate the optimal voltage and frequency to apply to the motor windings. This results in a smoother, more efficient, and more responsive motor. As electric vehicle technology continues to develop, more advanced and sophisticated motor controllers can emerge and be used to control the electric motors 320, 330 and/or the power converter 340.

In some exemplary embodiments, the motor controller 310 and the power converter 340 can also control the drive motors 320, 330 to generate electricity to charge the vehicle battery 350. For example, when a driver releases the throttle, or depresses the brake pedal, the drive motors 320, 330 can be placed in a regenerative mode to act as a generator to convert the vehicle's kinetic energy back into electric energy referred to as back electromotive force (EMF). Back EMF is a voltage generated by the rotating coils within the electric motors 320, 330 which opposes the voltage that is applied to the motors 320, 330. Back EMF is caused by electromagnetic induction. When a coil of wire moves through a magnetic field, an electric current is induced in the coil. The direction of the current is determined by Lenz's law, which states that the induced current will always flow in a direction that opposes the change in magnetic flux. In an electric motor 320, 330, the rotating coils are moving through a magnetic field created by permanent magnets or electromagnets. This induces a voltage in the coils, which is the back EMF. The back EMF is zero when the electric motor 320, 330 is not rotating. As the electric motor 320, 330 starts to rotate, the back EMF increases. As the electric motor 320, 330 rotates faster, the back EMF increases further.

Back EMF is an important concept in electric motor design and operation. It is responsible for a number of important effects, including reducing current consumption, reducing power consumption, and enabling regenerative braking. Regenerative braking systems take advantage of back EMF to generate electric energy to recharge the vehicle battery 350 and power vehicle electric systems. In a regenerative braking system, the kinetic energy of the moving vehicle is converted into back EMF and stored in the battery 350 using the electric motor 320, 330 as a generator. The motor controller 310 can control the power converter 340 to convert the energy generated by the back EMF from AC to DC to store the generated electricity back in the battery 350.

Problem can arise when one or more of the drive motors 320, 330 supplies a back EMF to the power converter 340 and the high voltage DC bus that exceeds a threshold voltage. For example, continued driving with a disabled drive motor 320, 330 on multi-motor vehicles, including both hub motors and drive unit motors, can generate a back EMF having a voltage level that exceeds a threshold difference over that of the battery 350. This excessive voltage can result in damage to the battery 350 and power converter 340. In some exemplary embodiments, vehicles with a disabled drive motor 320, 330 which can generate a back EMF exceeding the threshold difference are disabled by the vehicle controller 370 to avoid this potential damage. However, by controlling system voltage response limits to below these levels, the hazards can be prevented and vehicle availability can be expanded. If the system voltage response limits are unable to be met or cannot be controlled below these levels, the motor controller 310 or vehicle controller 370 can leverage mechanical braking to reduce speed and prevent the hazards. Supervisory controls can observe battery, motor, braking system limits, and vehicle load estimators to intervene if the open loop controls are not meeting the target voltage response fast enough to prevent a hazard from occurring.

In some exemplary embodiments, a back EMF voltage for a given motor's voltage constant, Ke, across temperature and speed ranges can first be calculated. This back EMP voltage across temperature and speed ranges can be stored in a memory communicatively coupled to the motor controller 310. This calculated back EMF voltage can then be used as a limit to the available battery power, further restricting the power converter 340 available maximum voltage limit below the current battery voltage.

The available maximum voltage limit can then be used to generate torque limits for the operational drive motor still producing torque. By limiting the operational motor torque, the overall system voltage response is kept below the calculated back EMF voltage. This limiting reduces the probability of occurrence of potential safety hazards and hardware damage. If the power converter 340 is unable to control to these torque limits due to battery 350 or environmental conditions, the motor controller 310 can engage mechanical torque reduction to ensure vehicle speed is lowered to a point at which the motor's default voltage response is lowered sufficiently to avoid potential damage or safety hazards.

The back EMF voltage point can be provided to the power converter 340 to establish a real time control point to ensure gate command matches the expected gate state. Without this closed loop design, the inverter gates may remain in a state which can cause hazards to occur at a system level. Throughout this operation state, the motor controller 310 and/or vehicle controller 370 can perform supervisory algorithms to observe the current motor temperatures, battery current and voltage limits, and the mechanical braking system limits. If the supervised levels leave target ranges for a given vehicle load for a period time, the motor controller 310 can shut down the vehicle to prevent the hazards from occurring. If any critical input to this controls strategy is lost, supervisory controls can command a minimum operating state based on vehicle speed that comprehends the lowest operating voltage point.

In some exemplary embodiments, an drive motor alternate power source 380 can be employed for use when the back EMF is greater than a threshold difference than the current battery charge level. The alternate power source 380, such as a fuel cell, alternate battery, electric generator or the like, can be employed to augment the current battery charge level to reduce the difference between the current battery charge level and the back EMF voltage level. This deployment of the alternate power source 380 can reduce potentially hazardous high amperage electrical currents from being coupled between the regenerative mode electric motor 320, 330 and the power converter 340.

Figure 4:
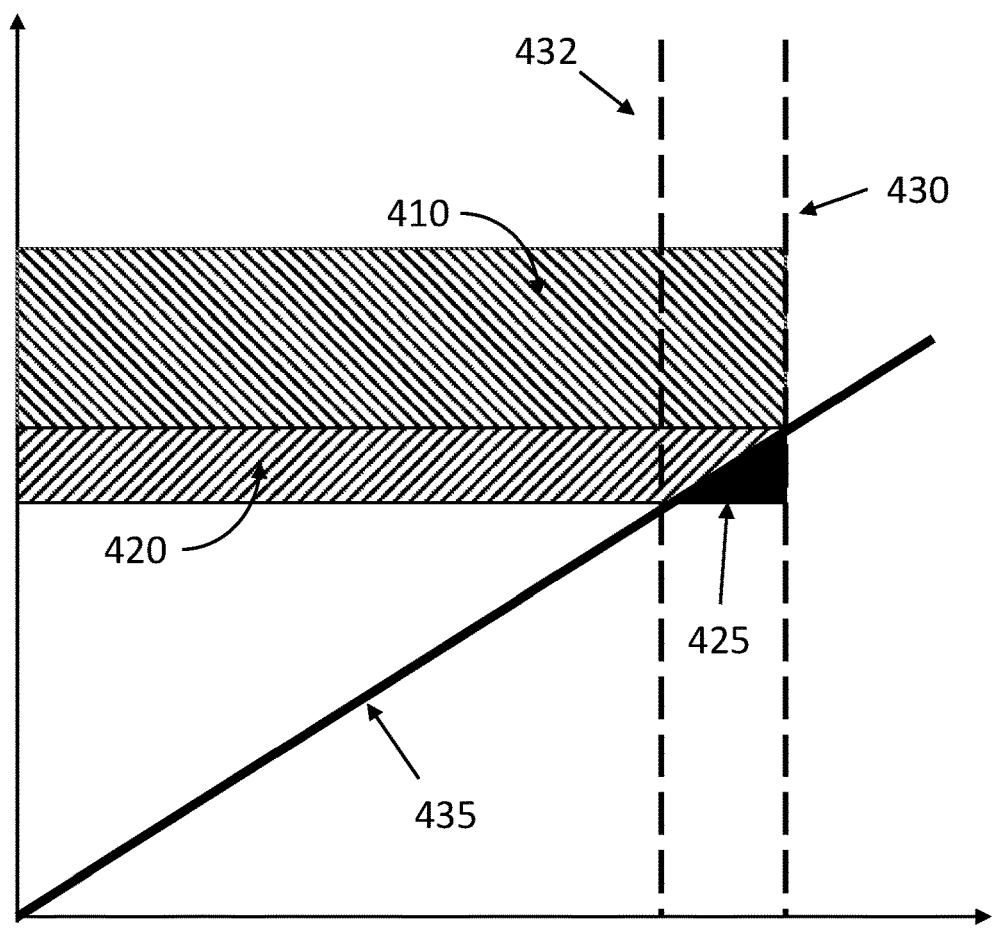
FIG. 4 shows a graph illustrative of the operating voltage with back EMF controls across vehicle speeds in accordance with various embodiments.

Turning now to FIG. 4, a graph 400 illustrative of the operating voltage with back EMF controls across vehicle speeds in accordance with various embodiments is shown. The graph 400 is illustrative of exemplary control regions when an electric motor is in regenerative mode. A current voltage level of the vehicle battery system is indicated on the vertical axis while the current vehicle speed is indicated on the horizontal axis. As the vehicle battery discharges while the vehicle is in use, the voltage indicated on the vertical axis will drop.

The graph 400 is first illustrative of line 435 indicative a maximum allowable rotor temperature for various back EMF voltages and vehicle speeds. In some exemplary embodiments, the maximum allowable rotor temperature can be 90° C. where the 90° C. threshold is the maximum desirable operating temperature to avoid potential system damage. In addition, a maximum operating speed is indicated 430 at which the vehicle is limited during regenerative braking due to motor failure. In some exemplary embodiments, the maximum operating speed can be 80 km/h. This vehicle speed limit to the controls region can be imposed to encourage vehicle repair.

The first allowable control region 410 is shown where the vehicle can be in regenerative mode and is limited under expected maximum allowable rotor temperatures 435 and the maximum operating speed 430. This first allowable control region 410 is indicative of a higher battery system charge level where a difference between the back EMF voltage level and the battery system voltage level will not have a difference great enough to result in potentially damaging high amperage currents between the regenerative mode motor and the battery system. In some exemplary embodiments, the first allowable control region 410 is indicative of current allowable control regions for vehicles having one or more disabled electric motors.

The second allowable control region 420 is shown where the battery charge level has decreased to a level such that the back EMF voltage level and the battery system voltage level can have a difference great enough to result in high currents between the regenerative mode motor operated at high speed and the battery system. A discharge region 425 is indicated where the vehicle may be operated below the maximum allowable speed and at a battery charge level that can result in the rotor temperature exceeding the maximum allowable rotor temperature 435. In this discharge region 425, a three phase short can be commanded to the power converter and/or vehicle motor. An allowable controls region 420 is indicated for vehicle operation with a regenerative mode motor mode while the battery system voltage is below the back EMF voltage, thereby potentially causing thermal damage to power converter. The exemplary algorithm facilitates operation of the vehicle at lower speed while the battery is at lower battery charge levels than would be allowable in an unregulated regenerative motor mode. In some exemplary embodiments, when the vehicle is in the discharge region 425, a second maximum speed level 432 can be implemented limiting the vehicle to a second maximum speed which is lower than the initial maximum allowable speed, thereby preventing the vehicle from operating in the discharge region 425.

Figure 5:
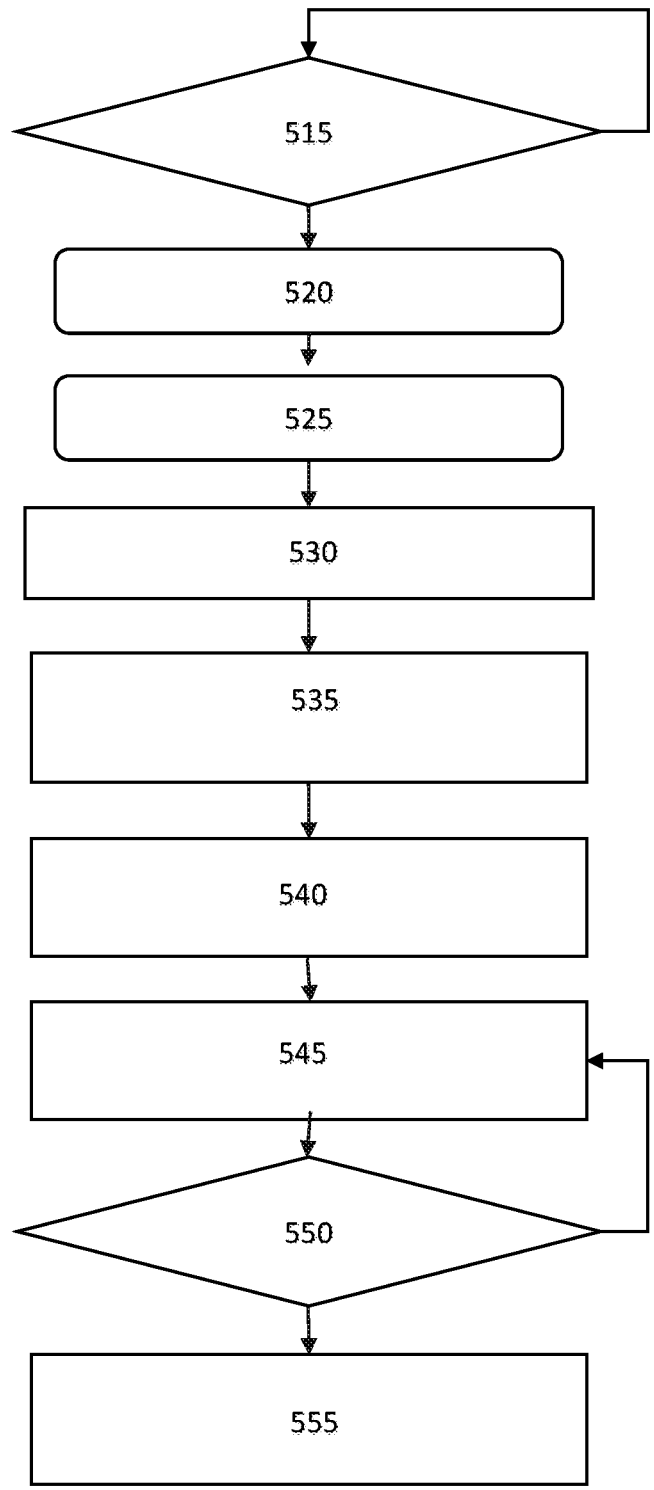
FIG. 5 shows a flowchart illustrative of a method for controller an exemplary EV propulsion system for use with back electromotive force management for electric vehicles in accordance with various embodiments.

Turning now to FIG. 5, a method 500 for operating an exemplary EV propulsion system for use with back electromotive force management for electric vehicles in accordance with various embodiments is shown. The exemplary method 500 is first operative to monitor 515 for at least one of a plurality of electric motors being in a motor fault state. This motor fault state can be determined in response to one or more diagnostic trouble codes (DTC) and fault flags. The motor fault can be detected at the power converter, motor controller, battery charger or the like and the DTCs and fault flags can tr received via a controller area network (CAN) bus or other data bus. The motor fault state can be indicative of a faulty electric drive motor that is being rotated in response to tire friction with the road surface while one or more other drive motors are actively propelling the vehicle. If the motor is not in motor fault state mode, the method 500 returns to detecting for a faulty motor 515.

If there is determined 515 to be one or more faulty motors, the method is next operative to initiate 520 the back EMF monitoring algorithm. The back EMF monitoring algorithm can be initiated in response to detection of the faulty motor and/or an initiation of an electric vehicle control and monitoring algorithm, in response to an electric vehicle being transitioned from a standby or off mode to a run mode. The run mode is a mode of operation of the vehicle in which vehicle movement can be initiated.

The exemplary method 500 is next operative to determine 525 a voltage gradient for expected back EMF for a faulty electric motor. The voltage gradient corresponds to a predicted back EMF for a particular motor at a plurality rotational speeds and a plurality of operational temperatures. The voltage gradient can be used to generate a lookup table, can be used to generate a threshold function, or can be stored in memory, a processor memory or algorithm, or other data storage medium accessible to a motor controller and/or power converter. In some exemplary embodiments, the back EMF voltage gradient can be provided by a faulted inverter associated with the faulty motor. In some exemplary embodiments, the back EMF can be provided in real time by the inverter to the supervisory control if the inverter is able to communicate or can be calculated by the supervisory control based on available information or worst case calibrations if communication with the inverter is not present, for example if the drive unit temperature is not known, it could use ambient temp if it were-10C.

The method 500 is next configured to determine 530 an open circuit battery discharge voltage (OCV). The OCV and the detected vehicle speed can be used to estimate if the difference between the OCV and the back EMF voltage gradient for a current vehicle speed may be less than a voltage corresponding to the minimum operational torque requirement. The voltage difference between the OCV and back EMF voltage gradient can be used to provide 535 torque and power determination to then calculate a minimum acceleration capability for a given vehicle speed in relation to the back EMF voltage curve or gradient. In addition, the motor controller, vehicle controller, or power converter may detect or determine vehicle mass, motor speed, inverter high voltage DC bus voltage, battery high voltage DC charge level, bus voltage, PSA status, motor stator & rotor temp, battery pack & cell UV and current limits, and/or mechanical braking system limits to estimate the potential DC voltage generated by the electric motor in the fault mode. For example, observation of motor temperature, battery current and voltage limits, and mechanical braking system limits relative to vehicle mass can be used to determine the estimated under load battery voltage. In response to the minimum acceleration requirement, the OCV and the back EMF voltage gradient, the method 500 can next determine 540 a maximum allowable vehicle speed. In some exemplary embodiments, the maximum vehicle speed can be established based on battery only available power imposed to ensure there is enough available power to meet minimum launch acceleration requirements. The method 500 can then limit the vehicle speed to a speed below the maximum allowable vehicle speed using a vehicle controller, throttle controller or brake controller. For example, the vehicle speed can be limited to 80 km/h or another reduced speed. The reduced speed can act as a safety measure to limit the back EMF being generated by the faulty electric motor during operation of the vehicle. The limited vehicle speed can further operate as an incentive for vehicle motor repair.

The method 500 can detect a current vehicle speed and determine if the current vehicle speed is greater than the maximum allowable vehicle speed. Alternatively, the method 500 can determine if the estimated under load battery voltage at the current vehicle speed or the OCV less the minimum operational torque voltage load is less than the predicted back EMF voltage gradient at the current vehicle speed. If the current vehicle speed exceeds the maximum allowable vehicle speed 550, supervisory remedial action controls can be initiated 555. The supervisory remedial action controls can include limiting the vehicle speed to a lower maximum vehicle speed, such as 40 km/h, and/or a three-phase short can be commanded for on both the faulty motor and the motor providing the tractive effort. In some exemplary embodiments, a supplemental power source, such as a fuel cell can be used to temporarily raise the battery charge voltage level to temporarily artificially raise the voltage of the battery above the OCV to provide additional torque, power, and speed determination head-room availability. In addition, friction brakes, or mechanical braking, can be engaged to reduce the vehicle speed and reduce back EMF voltage levels.

Figure 6:
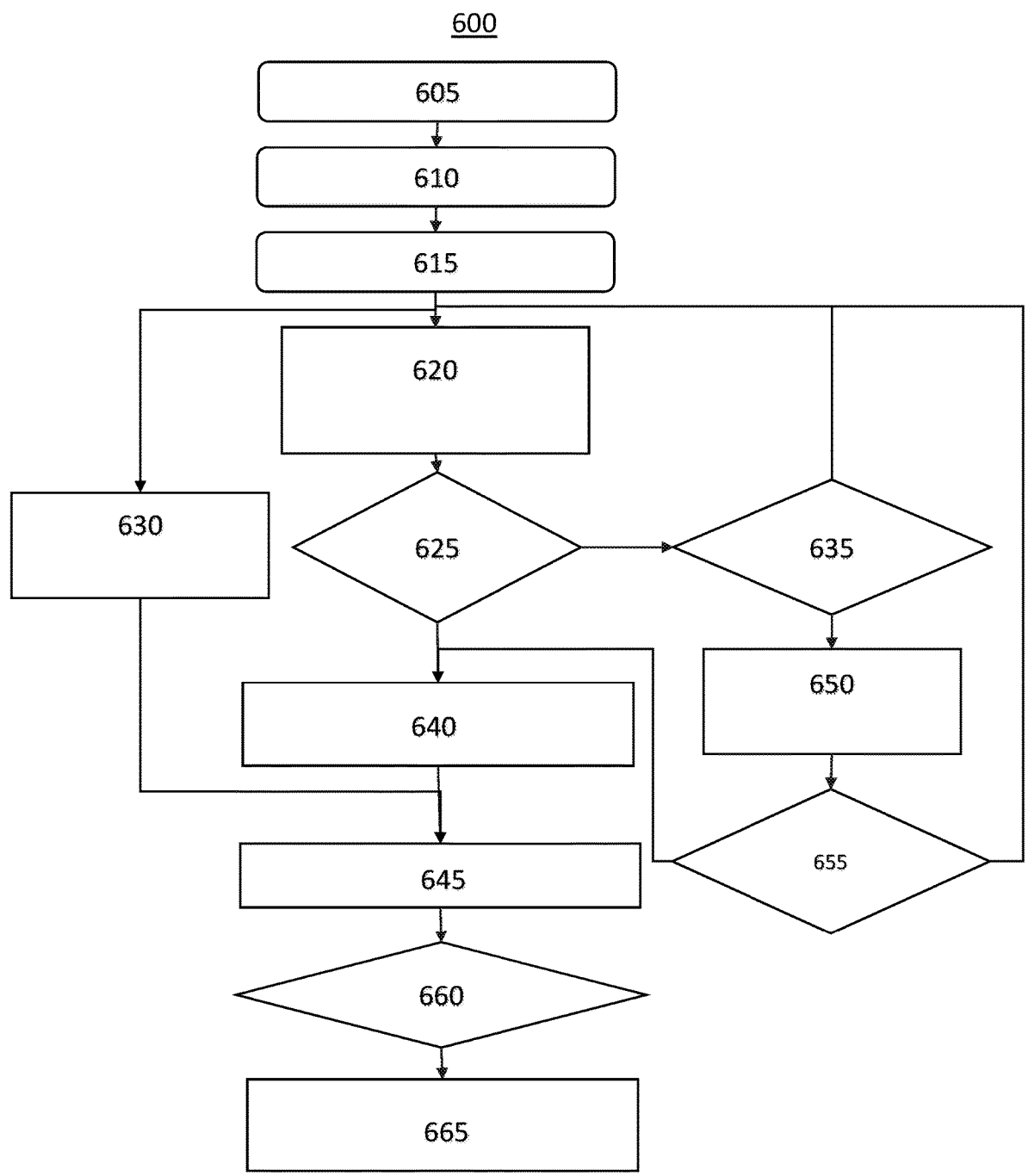
FIG. 6 shows a flowchart illustrative of another method for controller an exemplary EV propulsion system for use with back electromotive force management for electric vehicles in accordance with various embodiments.

Turning now to FIG. 6, another method 600 for operating an exemplary EV propulsion system for use with back EMF management for electric vehicles in accordance with various embodiments is shown. The exemplary method 600 is first operative to monitor 605 for electric motor faults. A motor fault can be determined in response to excessive current draw, incorrect rotational speed, out of range operating temperatures, or excessive vibration. Additionally, rotational sensors, such as Hall sensors resolver, reluctor sensor or sensorless feedback can be employed to detect the position of an electric motor. If the rotational sensor signals do not correspond to the expected motor position, a motor fault may be assumed. A faulty electric motor can result in back EMF generated by the motor and coupled to the vehicle battery, vehicle power system or the like. If this back EMF exceeds the output voltage of the vehicle battery, damage to the electric motor, the battery, the high voltage bus, or other vehicle systems can occur.

If a motor fault is detected, the method 600 is next operative to initiate 610 the back EMF management algorithm. The back EMF management algorithm is operative to limit rotation of the faulty battery such that any back EMF generated by the battery is restricted to a level below the OCV of the battery. Back EMF can be generated by the rotation of the rotor of the faulty motor. In some exemplary embodiments, the back EMP management algorithm can be configured for redirecting an under-voltage limit to a predicted back EMF voltage for the faulty motor at a current vehicle speed. This provides for a narrower voltage subset of the rechargeable energy storage system (RESS) voltage range. The algorithm can direct the open and closed loop hybrid operating controls and under-voltage controls in response to power and torque determination based on protection against a commanded three phase short.

In response to initiating the algorithm, the method 600 is operative to calculate 615 a back EMF gradient for the faulted motor across motor speeds for the current motor temperature. The back EMF gradient is the expected back EMF generated for a particular motor rotational speed at given temperatures. As the rotational speed of the motor is increased, corresponding to an increased vehicle speed, a higher voltage back EMF is generated. In some exemplary embodiments, the back EMF can be a volts per rpm value varying with temperature of the motor. This back EMF gradient can be stored in a memory, lookup table, or a used to generate a back EMF prediction formula to be used by the back EMF management algorithm. The back EMF gradient can further be coupled 630 to the monitoring device for monitoring device for monitoring 645 key parameters. In some exemplary embodiments, the method 600 can determine 630 a back EMF voltage gradient corresponding to a torque voltage limit. The back EMF voltage gradient to torque voltage limit can replace the battery under voltage limit at vehicle speeds when the back EMF voltage is predicted to exceed the battery under voltage limit.

The method 600 is next operative to determine 620 if the available power for a given voltage point on the back EMF gradient exceeds the minimum required power. The minimum required power is the amount of power required to be supplied to the one or more currently operational drive motors to maintain the minimum required operation torque. In some exemplary embodiments, this minimum required operational torque can be the amount of torque required to maintain a vehicle speed on a hill of a certain grade, such as a 3% grade, or to provide a minimum acceleration for the vehicle on a flat grade. The available torque is determined in response to a difference between a current OCV and the predicted back EMF for the vehicle speed and faulty motor temperature. The minimum operational torque corresponds to an expected battery voltage drop in response to the minimum operational torque demand such that the under-load battery voltage continues to exceed the back EMF gradient voltage at a particular speed.

In response to the available power for a given voltage point on the back EMF gradient, the method 600 is next operative to determine if the available power is greater than the minimum required power for minimum vehicle performance.

In some exemplary embodiments, if 625 the available power is not greater than the minimum required power, the method 600 determines 635 if there is an alternate power source available, such as a fuel cell, auxiliary battery, or other voltage supply devices. If no alternate power source is available, the method 600 returns to determining 620 available power for the given voltage point. If an alternative power source is available, the method 600 can activate 650 the alternative power source to temporarily raise the OCV. This temporarily artificially raising of the voltage of the battery above the OCV to provide additional torque, power, and speed determination head-room availability. The fuel cell, or a series generator, can be used to provide additional voltage drop headroom based on that back EMF voltage from the faulted motor that in-turn provides additional torque and power for tractive effort in the inverter module and motors.

The method 600 next determines 655 if the combined power is greater than the minimum power required. If the combined power is not greater than the minimum required power, the method 600 returns to determining 620 available power for the given voltage point. If the combined power is greater than the minimum required power, the method 600 next limits 640 the vehicle speed based on the predicted back EMF voltage point for the motor speed associated with the new and higher level of available power and torque available.

The method 600 next monitors 645 key parameters of the vehicle speed, bus voltage, motor temperatures, battery voltage and the battery under voltage limit. The method 600 checks these key parameters against predetermined threshold values. If none of the threshold values are exceed, the method 600 returns to monitoring 645 the key parameters. If one or more of the threshold values are exceeded, the method 600 can take 665 additional protective measures. In some exemplary embodiments, the protective measures can include engaging friction brakes or other regenerative braking motors, or to initiate three phase shorts on the faulty motor, one or more active drive motors, or all motors. In addition, the method 600 can disable the vehicle if one or more key parameters exceed threshold values.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A propulsion system comprising:
a first electric motor configured to propel a vehicle in a drive mode in response to a first drive current, wherein the first electric motor is mechanically coupled to a first wheel and wherein the vehicle is propelled in response to a rotation of the first wheel;
a second electric motor operative to propel the vehicle in the drive mode in response to a second drive current, wherein the second electric motor is mechanically coupled to a second wheel and wherein the vehicle is propelled in response to a rotation of the second wheel, and wherein the second electric motor generates a back electromotive force voltage in response to a rotation of the second wheel resulting from a propulsion of the vehicle by the first electric motor when the second electric motor is in a fault mode;
a battery, having an open circuit battery discharge voltage, for generating the first drive current for coupling to the first electric motor; and
a vehicle controller for limiting the first drive current in response to a difference between the back electromotive force voltage and the open circuit battery discharge voltage being less than a threshold voltage difference, wherein the first drive current is limited in response to a limiting of the operation motor torque such that the back electromotive force voltage is kept below the open circuit battery discharge voltage.

2. The propulsion system of claim 1, wherein the battery forms part of a rechargeable energy storage system.

3. The propulsion system of claim 1, a vehicle speed sensor for determining a vehicle speed and wherein the threshold voltage difference is determined in response to the vehicle speed and a predicted motor torque and a predicted motor power of the second electric motor at the vehicle speed and a predicted back electromotive force voltage of the second electric motor in the fault mode wherein the predicted back electromotive force voltage is established by calculating a voltage gradient of the second electric motor across a range of temperatures and a range of speeds and wherein the predicted back electromotive force voltage is provided in a lookup table across the range of temperatures and the range of speeds.

4. The propulsion system of claim 1, a battery charge level sensor for determining a battery charge level and wherein the threshold voltage difference is determined in response to the battery charge level and the back electromotive force voltage.

5. The propulsion system of claim 1, a processor for calculating a predicted motor torque and a predicted motor power of the first electric motor and wherein the first drive current is further limited in response to a discharge voltage limit of the back electromotive force voltage.

6. The propulsion system of claim 1, wherein the vehicle controller is further configured to apply a mechanical brake to the first electric motor in response to the difference between the back electromotive force voltage and the open circuit battery discharge voltage being less than a threshold voltage difference.

7. The propulsion system of claim 1, wherein the vehicle controller is further configured to reduce a vehicle speed in response to the difference between the back electromotive force voltage and the open circuit battery discharge voltage being less than a threshold voltage difference.

8. The propulsion system of claim 1, wherein the vehicle controller is further configured to short at least three phases of the second electric motor in response to the difference between the back electromotive force voltage and the open circuit battery discharge voltage being less than a threshold voltage difference.

9. The propulsion system of claim 1 including a fuel cell and wherein the vehicle controller is further configured to activate the fuel cell in response to the difference between the back electromotive force voltage and the open circuit battery discharge voltage being less than a threshold voltage difference, wherein the fuel cell is configured to generate an auxiliary voltage to elevate the open circuit battery discharge voltage to increase the difference between the back electromotive force voltage and the open circuit battery discharge voltage.

10. The propulsion system of claim 1, wherein the vehicle controller is further configured to detect a defective state of the second electric motor and for limiting a vehicle speed in response to a detection of the defective state of the second electric motor.

11. A method of controlling a rechargeable energy storage propulsion system comprising:
propelling a vehicle in a drive mode in response to a first drive current using a first electric motor mechanically coupled to a first wheel and wherein the vehicle is propelled in response to a rotation of the first wheel;
generating a back electromotive force voltage by a second electric motor mechanically coupled to a second wheel and wherein the second electric motor generates the back electromotive force voltage in response to a rotation of the second wheel resulting from a propulsion of the vehicle by the first electric motor;
determining a vehicle speed in response to a rotational speed of the first electric motor detected by a rotational sensor;
determining, by a battery management system, a battery output voltage; and
limiting a motor torque to the first electric motor, in response to a difference between the back electromotive force voltage and the battery output voltage being less than a threshold difference, wherein the first drive current is limited in response to a limiting of the motor torque such that the back electromotive force voltage is kept below the battery output voltage.

12. The method of controlling the rechargeable energy storage propulsion system of claim 11, determining the at least one of the torque and the power to the drive unit in response to the difference between the back electromotive force voltage and the battery output voltage being less than a threshold difference and wherein the threshold difference is determined in response to the vehicle speed and a predicted motor torque and a predicted motor power of the second electric motor at the vehicle speed and a predicted back electromotive force voltage of the second electric motor, wherein the predicted back electromotive force voltage is established by calculating a voltage gradient of the second electric motor across a range of temperatures and a range of speeds and wherein the predicted back electromotive force voltage is provided in a lookup table across the range of temperatures and the range of speeds.

13. The method of controlling the rechargeable energy storage propulsion system of claim 11, wherein the back electromotive force voltage is limited by reducing a speed of a host vehicle.

14. The method of controlling the rechargeable energy storage propulsion system of claim 11, wherein the back electromotive force voltage is limited by actuating a short of at least three coils of the second electric motor.

15. The method of controlling the rechargeable energy storage propulsion system of claim 11, wherein the threshold difference is determined in response to a difference between a predicted back electromotive force voltage determined in response to the vehicle speed and the battery output voltage.

16. The method of controlling the rechargeable energy storage propulsion system of claim 11, wherein the back electromotive force voltage is estimated in response to the vehicle speed and a least one of a stator temperature and a rotor temperature of the second electric motor.

17. The method of controlling the rechargeable energy storage propulsion system of claim 11, wherein the back electromotive force voltage is calculated in response to the second electric motor being in a fault state and a drive motor being in a drive state.

18. The method of controlling the rechargeable energy storage propulsion system of claim 11, further including an alternate power source and a controls to artificially elevate the open circuit battery discharge voltage via the alternate power source to provide an additional voltage drop headroom between the open circuit battery discharge voltage and the back electromotive force voltage in order to provide an additional torque and power for a tractive effort in a drive motor in a drive state.

19. A rechargeable energy storage system propulsion control system comprising:
   a first electric motor configured to configured to propel a vehicle in response to a first drive current, wherein the first electric motor is mechanically coupled to a first wheel and wherein the vehicle is propelled in response to a rotation of the first wheel;
   a second electric motor configured to propel the vehicle in response to a second drive current and operative to generate a back electromotive force voltage in during a fault state, wherein the second electric motor is mechanically coupled to a second wheel and wherein the vehicle is propelled in response to a rotation of the second wheel and wherein the back electromotive force voltage is generated in response to a rotation of the second wheel resulting from a propulsion of the vehicle by the first electric motor;
   a battery for storing an electric charge for generating the first drive current and the second drive current, wherein the battery has an open circuit battery discharge voltage; and
   a controller, including a processor, configured for limiting the first drive current in response to a difference between the open circuit battery discharge voltage and the back electromotive force voltage being less than a threshold difference, wherein the first drive current is limited in response to a limiting of the operation motor torque such that the back electromotive force voltage is kept below the open circuit battery discharge voltage.

20. The rechargeable energy storage system propulsion control system of claim 19, wherein the controller is further configured to limit a vehicle speed in response the second electric motor being in a fault state and at least one of a determined minimum torque and a determined minimum power to be available to the first electric motor unit in response to the difference between the back electromotive force voltage and the open circuit battery discharge voltage being less than a threshold.

* * * * *